(12) United States Patent
Boehm

(10) Patent No.: US 10,981,505 B2
(45) Date of Patent: Apr. 20, 2021

(54) AUTO SWITCHING OF DISPLAY MIRROR ASSEMBLY

(71) Applicant: Gentex Corporation, Zeeland, MI (US)

(72) Inventor: Neil J. Boehm, Allegan, MI (US)

(73) Assignee: GENTEX CORPORATION, Zeeland, MI (US)

( * ) Notice: Subject to any disclaimer, the term of this patent is extended or adjusted under 35 U.S.C. 154(b) by 267 days.

(21) Appl. No.: 15/905,976

(22) Filed: Feb. 27, 2018

(65) Prior Publication Data

US 2018/0244204 A1    Aug. 30, 2018

Related U.S. Application Data

(60) Provisional application No. 62/465,023, filed on Feb. 28, 2017.

(51) Int. Cl.
*B60R 1/00* (2006.01)
*B60R 1/08* (2006.01)
(Continued)

(52) U.S. Cl.
CPC .............. *B60R 1/00* (2013.01); *B60R 1/04* (2013.01); *B60R 1/08* (2013.01); *B60R 1/12* (2013.01);
(Continued)

(58) Field of Classification Search
CPC .. B60R 1/08; B60R 1/00; B60R 11/04; B60R 1/04; B60R 1/12; B60R 2300/8026; B60R 2011/004; B60R 2300/8046; B60R 2300/8066; B60R 2300/108; B60R 2001/1253; H04N 5/232; H04N 5/2253;
(Continued)

(56) References Cited

U.S. PATENT DOCUMENTS 3,659,307 A   5/1972   Vitou
4,063,258 A   12/1977  Allen
(Continued)

FOREIGN PATENT DOCUMENTS

DE    102012020295 A1   4/2014
EP        1006486 A2    6/2000
(Continued)

*Primary Examiner* — Richard A Hansell, Jr.
(74) *Attorney, Agent, or Firm* — Price Heneveld LLP; Bradley D. Johnson

(57) ABSTRACT

A blocked imager detection system includes a rearview assembly having an actuator device. The actuator device is adjustable to tilt an electro-optic element, thereby moving the electro-optic element to an off-axis position which changes an activation state of a display module. The actuator device is also adjustable to tilt the electro-optic element in another direction, thereby moving the electro-optic element to an on-axis position which changes the activation state of the display module. An imager is configured to capture image data of a scene external to the controlled vehicle and to generate image data for display on the display module. When a controller determines that the operational capability of the imager to capture image data is at least partially diminished, the controller can generate a control signal indicating that imager performance has been compromised and deactivate the display module.

19 Claims, 11 Drawing Sheets

(51) Int. Cl.

| | | |
|---|---|---|
| *B60R 1/12* | (2006.01) | |
| *B60S 1/02* | (2006.01) | |
| *B60S 1/56* | (2006.01) | |
| *G02B 27/00* | (2006.01) | |
| *G06K 9/00* | (2006.01) | |
| *H04N 5/225* | (2006.01) | |
| *H04N 5/232* | (2006.01) | |
| *B60R 1/04* | (2006.01) | |
| *B60R 11/04* | (2006.01) | |
| *G02F 1/15* | (2019.01) | |
| *B60R 11/00* | (2006.01) | |

(52) U.S. Cl.
CPC ............... *B60R 11/04* (2013.01); *B60S 1/026* (2013.01); *B60S 1/56* (2013.01); *G02B 27/0006* (2013.01); *G06K 9/00791* (2013.01); *H04N 5/2253* (2013.01); *H04N 5/2254* (2013.01); *H04N 5/2257* (2013.01); *H04N 5/232* (2013.01); *H04N 5/23293* (2013.01); *H04N 5/23299* (2018.08); *B60R 2001/1253* (2013.01); *B60R 2011/004* (2013.01); *B60R 2300/108* (2013.01); *B60R 2300/8026* (2013.01); *B60R 2300/8046* (2013.01); *B60R 2300/8066* (2013.01); *G02F 1/15* (2013.01)

(58) Field of Classification Search
CPC ........... H04N 5/23299; H04N 5/23293; H04N 5/2257; H04N 5/2254; G06K 9/00791; G02B 27/0006; B60S 1/56; B60S 1/026; G02F 1/15
See application file for complete search history.

(56) References Cited

U.S. PATENT DOCUMENTS

| | | | |
|---|---|---|---|
| 4,410,563 A | 10/1983 | Richter et al. | |
| 4,621,785 A | 11/1986 | Embra | |
| 4,699,478 A | 10/1987 | Tsui et al. | |
| 4,736,218 A | 4/1988 | Kutman | |
| 5,068,770 A | 11/1991 | Baziuk | |
| 5,121,200 A | 6/1992 | Choi | |
| 5,315,333 A | 5/1994 | Nash | |
| 5,418,567 A | 5/1995 | Boers et al. | |
| 5,619,036 A | 4/1997 | Salvio et al. | |
| 5,760,828 A | 6/1998 | Cortes | |
| 5,761,556 A | 6/1998 | Ichino | |
| 5,833,101 A | 11/1998 | Watkins | |
| 6,138,319 A | 10/2000 | Benoit | |
| 6,333,759 B1 | 12/2001 | Mazzilli | |
| 6,536,961 B1 | 3/2003 | Gillies | |
| 6,580,373 B1 | 6/2003 | Ohashi | |
| 6,607,606 B2 | 8/2003 | Bronson | |
| 6,619,806 B2 | 9/2003 | Akami et al. | |
| 6,731,867 B1 | 5/2004 | Sherwin | |
| 6,911,997 B1 | 6/2005 | Okamoto et al. | |
| 7,104,657 B2 | 9/2006 | Sherwin | |
| 7,111,996 B2 | 9/2006 | Seger et al. | |
| 7,245,207 B1 | 7/2007 | Dayan et al. | |
| 7,265,656 B2 | 9/2007 | McMahon et al. | |
| 7,355,629 B2 | 4/2008 | Lang et al. | |
| 7,370,983 B2* | 5/2008 | DeWind | B60K 35/00 359/844 |
| 7,387,454 B2 | 6/2008 | Kikuchi et al. | |
| 7,448,812 B2 | 11/2008 | Heibel | |
| 7,499,100 B2 | 3/2009 | Miyazaki et al. | |
| 7,579,939 B2 | 8/2009 | Schofield et al. | |
| 7,609,961 B2 | 10/2009 | Park | |
| 7,630,624 B2 | 12/2009 | Chang | |
| 7,813,639 B2 | 10/2010 | Yoneji | |
| 7,881,496 B2 | 2/2011 | Camilleri et al. | |
| 7,883,064 B2 | 2/2011 | Luft et al. | |
| 7,891,886 B2 | 2/2011 | Schuetz | |
| 7,965,336 B2 | 6/2011 | Bingle et al. | |
| 8,031,224 B2 | 10/2011 | Linsenmaier et al. | |
| 8,077,406 B2 | 12/2011 | Hachitani et al. | |
| 8,118,501 B2 | 2/2012 | Buschmann | |
| 9,057,875 B2* | 6/2015 | Fish, Jr. | H05K 9/0054 |
| 9,229,104 B2 | 1/2016 | Klar et al. | |
| 9,838,653 B2 | 12/2017 | Fish, Jr. et al. | |
| 9,849,836 B2 | 12/2017 | Minikey, Jr. et al. | |
| 2003/0128436 A1* | 7/2003 | Ishii | G02B 27/01 359/630 |
| 2005/0275738 A1 | 12/2005 | Arai | |
| 2006/0171704 A1 | 8/2006 | Bingle et al. | |
| 2006/0238318 A1 | 10/2006 | Brouwer et al. | |
| 2006/0256459 A1 | 11/2006 | Izabel et al. | |
| 2007/0132610 A1 | 6/2007 | Guemalec et al. | |
| 2007/0182817 A1 | 8/2007 | Briggance | |
| 2007/0223899 A1 | 9/2007 | Snow | |
| 2007/0236569 A1 | 10/2007 | Lin | |
| 2009/0066793 A1* | 3/2009 | Takeda | H04N 17/002 348/148 |
| 2009/0122141 A1 | 5/2009 | Nakamura et al. | |
| 2009/0250533 A1 | 10/2009 | Akiyama et al. | |
| 2010/0118145 A1 | 5/2010 | Betham et al. | |
| 2010/0277379 A1 | 11/2010 | Lindackers et al. | |
| 2011/0033663 A1 | 2/2011 | Svec et al. | |
| 2011/0037863 A1 | 2/2011 | Mihota et al. | |
| 2011/0141281 A1 | 6/2011 | Barefoot et al. | |
| 2011/0266375 A1* | 11/2011 | Ono | B60S 1/54 239/589 |
| 2011/0317298 A1 | 12/2011 | Van Stiphout | |
| 2014/0070698 A1* | 3/2014 | Pierce | B60Q 1/085 315/82 |
| 2014/0111684 A1 | 4/2014 | Corbin et al. | |
| 2014/0253731 A1 | 9/2014 | Suman et al. | |
| 2015/0279018 A1* | 10/2015 | Bajard | H04N 13/286 382/154 |
| 2016/0001706 A1* | 1/2016 | Fish, Jr. | B60R 1/12 359/275 |
| 2016/0191863 A1 | 6/2016 | Minikey, Jr. et al. | |
| 2017/0355312 A1* | 12/2017 | Habibi | H04N 7/183 |
| 2018/0091779 A1 | 3/2018 | Hendricks | |

FOREIGN PATENT DOCUMENTS

| | | |
|---|---|---|
| EP | 1227683 A1 | 7/2002 |
| EP | 1529688 B1 | 2/2007 |
| KR | 100909368 B1 | 7/2009 |
| KR | 101134305 B1 | 4/2012 |
| KR | 101343814 B1 | 12/2013 |

\* cited by examiner

AUTO SWITCHING OF DISPLAY MIRROR ASSEMBLY

CROSS-REFERENCE TO RELATED APPLICATION

This application claims priority to and the benefit under 35 U.S.C. § 119(e) of U.S. Provisional Application No. 62/465,023, filed on Feb. 28, 2017, entitled "AUTO SWITCHING OF DISPLAY MIRROR ASSEMBLY," the disclosure of which is hereby incorporated herein by reference in its entirety.

FIELD OF THE DISCLOSURE

The present disclosure generally relates to a display mirror assembly, and more particularly, to auto switching of a display mirror assembly.

SUMMARY OF THE DISCLOSURE

According to one aspect of the present disclosure, a blocked imager detection system is used in a controlled vehicle and includes a rearview assembly having an actuator device operably coupled with an electro-optic element. The actuator device is adjustable to tilt the electro-optic element in one direction, thereby moving the electro-optic element to an off-axis position which approximately simultaneously changes an activation state of a display module. The actuator device is also adjustable to tilt the electro-optic element in another direction, thereby moving the electro-optic element to an on-axis position which approximately simultaneously changes the activation state of the display module. An imager is configured to capture images of a scene external to the controlled vehicle for display on the display module. A controller is configured to receive blocked imager information relating to an image capturing capability of the imager. When the controller determines that the operational capability of the imager to capture image data is at least partially diminished, the controller can generate a control signal indicating that imager performance has been compromised and deactivate the display module.

According to another aspect of the present disclosure, a blocked imager detection system is used in a controlled vehicle and includes a display module and an electro-optic element disposed adjacent to the display module. A rearview assembly includes an actuator device operably coupled with the electro-optic element, wherein the actuator device is adjustable to tilt the electro-optic element between an off-axis position which approximately simultaneously changes the display module to a first activation state, and an on-axis position which approximately simultaneously changes the display module to a second activation state. A controller is configured to receive image data from an imager, wherein when the controller determines that the operational capability of the imager to capture images is at least partially diminished, the controller can generate a control signal indicating that imager performance has been compromised and deactivate the display module.

According to yet another aspect of the present disclosure, a rearview assembly for a vehicle includes a housing, an electro-optic element disposed in an opening of the housing, and a display module disposed between the electro-optic element of the housing. The rearview assembly includes an actuator device operably coupled with the electro-optic element, wherein the actuator device is adjustable to tilt the electro-optic element between first and second positions. A controller is configured to receive image data from an imager, wherein when the controller determines that the operational capability of the imager to capture images is at least partially diminished, the controller can generate a control signal indicating that imager performance has been compromised and deactivate the display module.

These and other features, advantages, and objects of the present disclosure will be further understood and appreciated by those skilled in the art by reference to the following specification, claims, and appended drawings.

DETAILED DESCRIPTION

Figure 1:
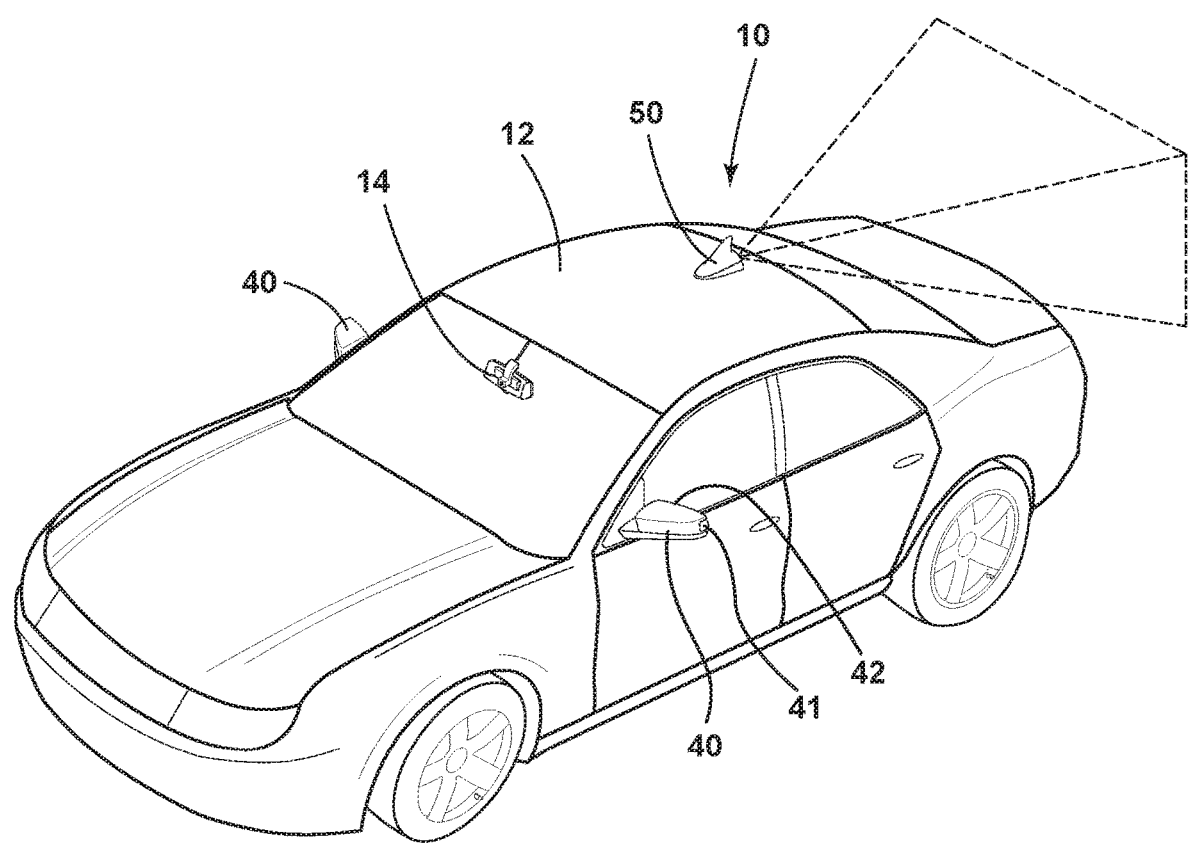
FIG. 1 is a top perspective view of a roof mounted antenna and imager module of the present disclosure installed on a roof of a vehicle.

The present illustrated embodiments reside primarily in combinations of method steps and apparatus components related to a display mirror assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
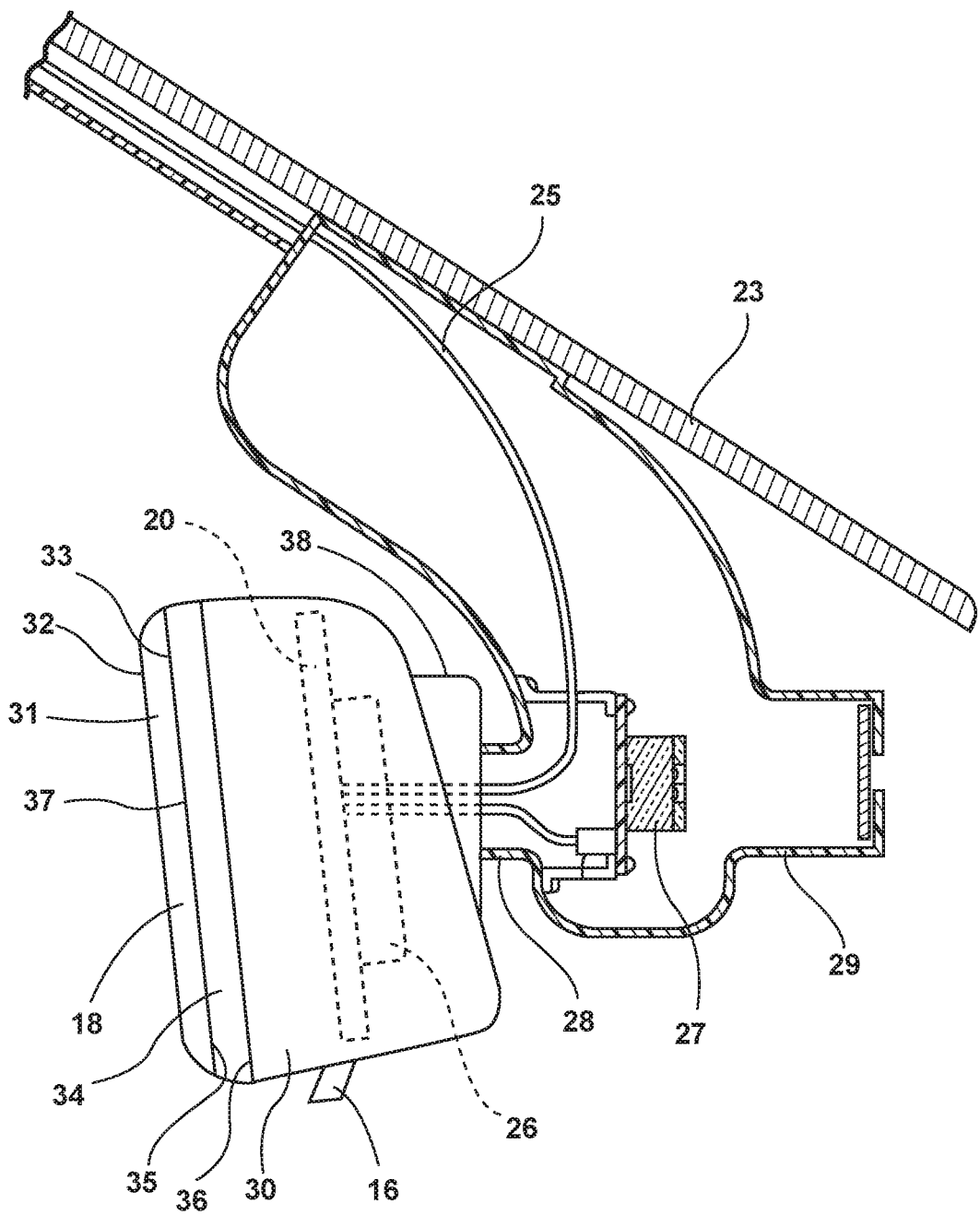
FIG. 2 is an enlarged side elevational view of a rearview assembly with the display module in an off-axis position.
Figure 3:
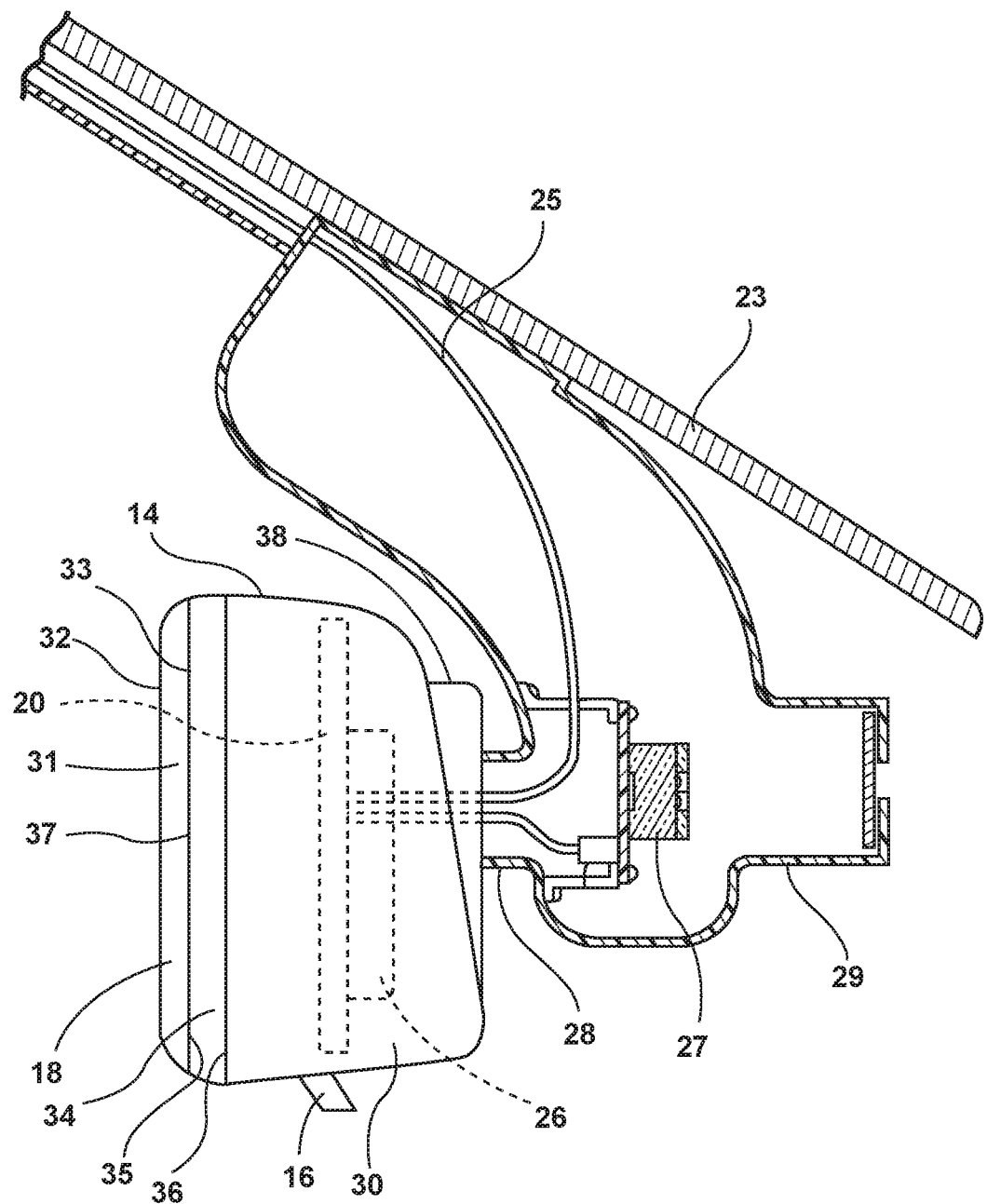
FIG. 3 is an enlarged side elevational view of a rearview assembly with the display module in an on-axis position.
Figure 4:
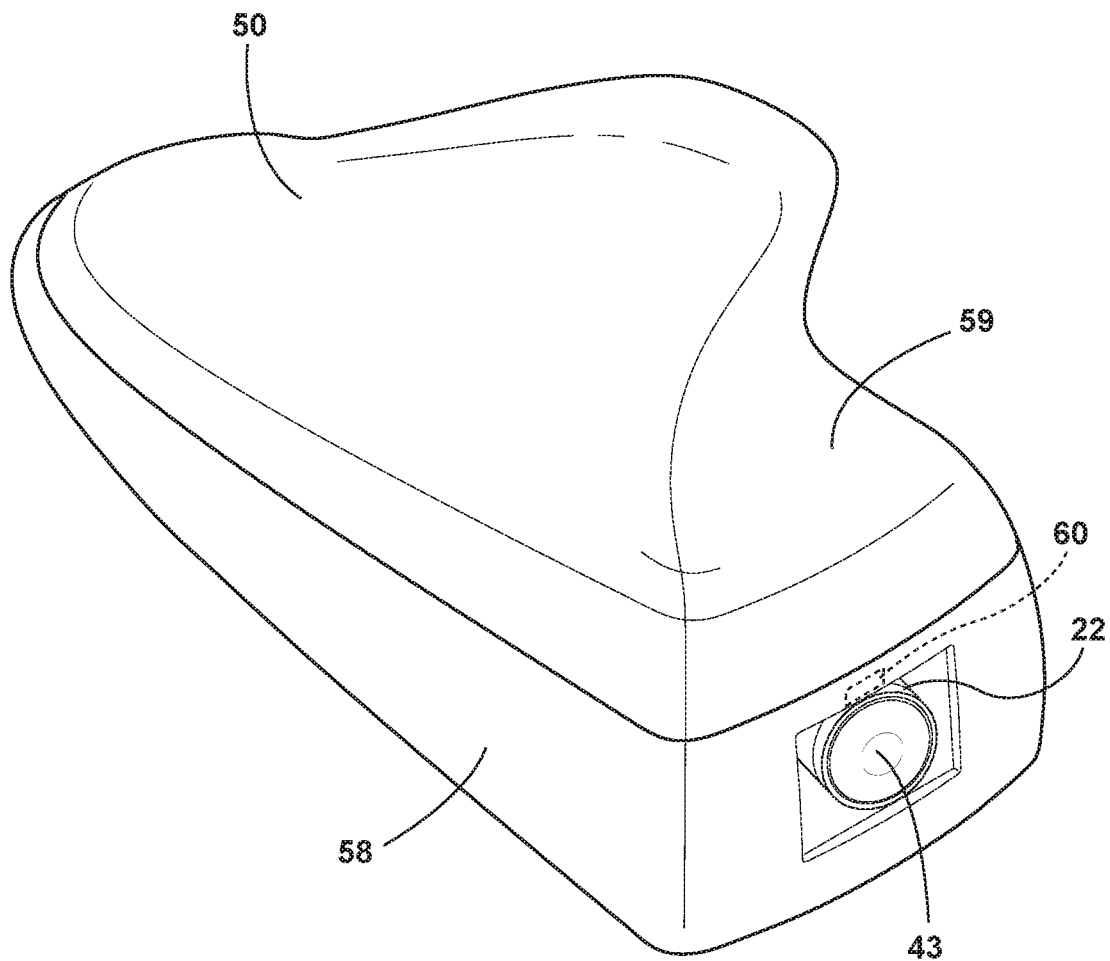
FIG. 4 is a rear top perspective view of a roof mounted antenna and imager module of the present disclosure with a lens.
Figure 5:
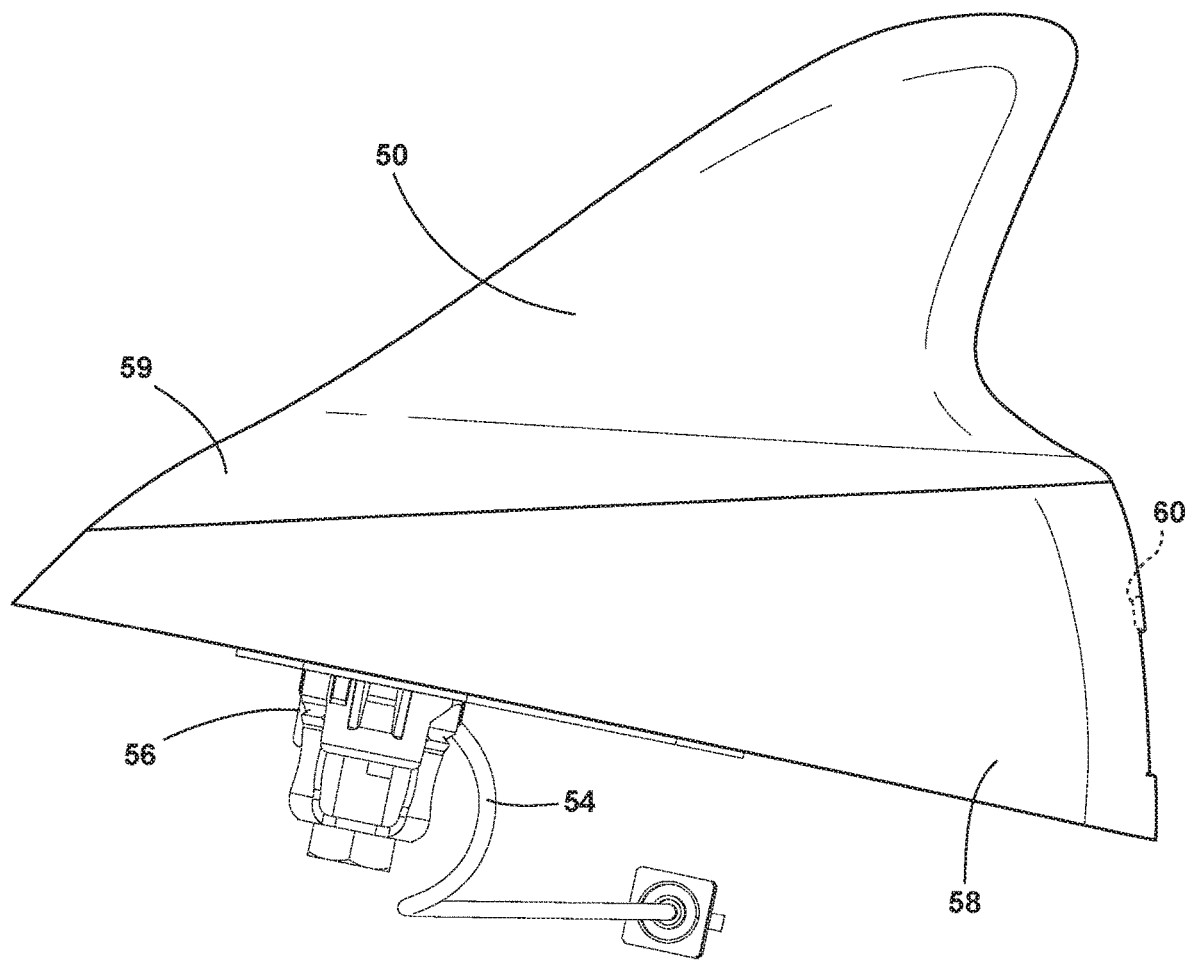
FIG. 5 is a side elevational view of the roof mounted antenna and imager module of FIG. 4.
Figure 6:
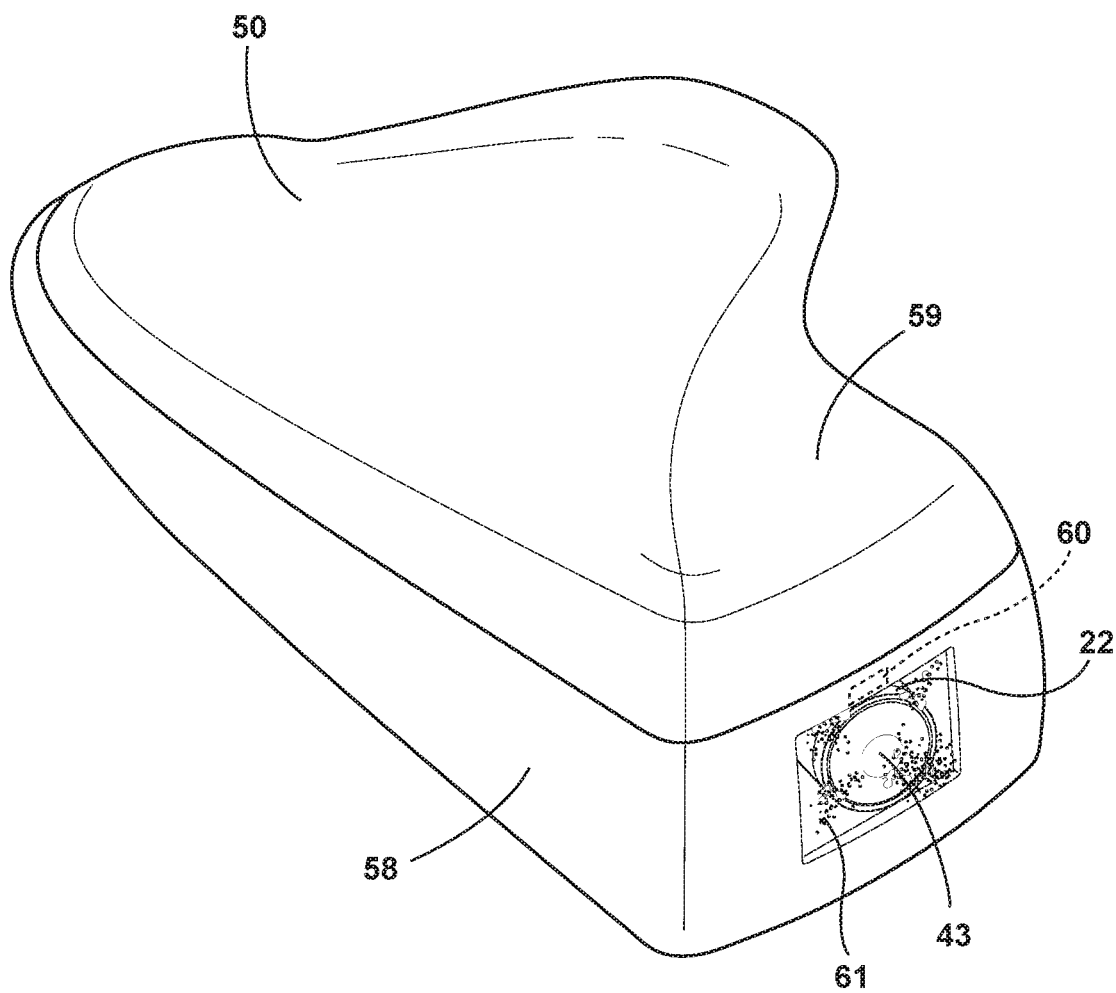
FIG. 6 is a rear top perspective view of a roof mounted antenna and imager module with debris on the lens.
Figure 7:
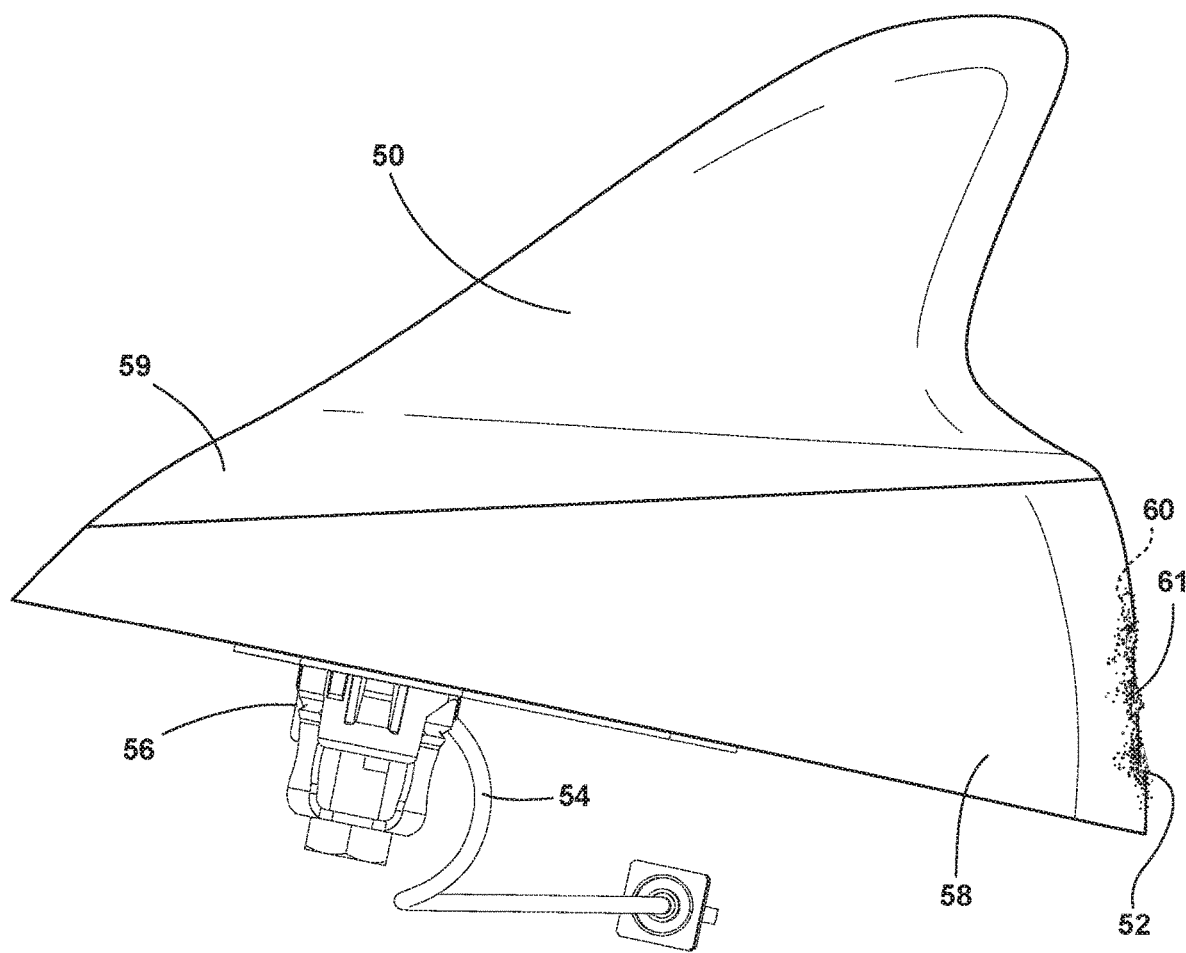
FIG. 7 is a side elevational view of the roof mounted antenna and imager module of FIG. 6 with debris on the lens.

Referring to FIGS. 1-9, reference numeral 10 generally designates a blocked imager detection system 10 for use in a controlled vehicle 12. A rearview assembly 14 includes an actuator device 16 operably coupled with an electro-optic element 18. The actuator device 16 is adjustable to tilt the electro-optic element 18 in one direction, thereby moving the electro-optic element 18 to an off-axis position which approximately simultaneously changes an activation state of a display module 20 (FIG. 2). The actuator device 16 is also adjustable to tilt the electro-optic element 18 in another direction, thereby moving the electro-optic element 18 to an on-axis position which approximately simultaneously changes the activation state of the display module 20 (FIG. 3). An imager 22 is configured to capture images of a scene external to the controlled vehicle 12 for display on the display module 20. A controller 26 is configured to receive blocked imager information relating to the image data captured by the imager 22. When the controller 26 determines that the operational capability of the imager 22 to capture image data is at least partially obstructed and/or impaired, the controller 26 can generate a control signal indicating that the imager 22 is blocked and deactivate the display module 20.

The embodiments set forth herein relate to a rearview assembly 14 and blocked imager detection system 10 that are in communication and configured to provide a rearward view of a vehicle to a driver of the vehicle. The blocked imager detection system 10 is configured to identify a blocked or otherwise malfunctioning imager condition and also sense operational temperature of the imager 22. In at least one instance as set forth herein, the operational temperature may be defined as a temperature range within which the imager 22 operates. The temperature range may vary depending on factors including environmental temperature and self-heating during operation of the imager 22. The environmental temperature may include the temperature outside the controlled vehicle 12. In most instances, the operational temperature of the imager 22 will tend to increase with an increasing environmental temperature and decrease with a decreasing environmental temperature. However, there are instances where the operational temperature and environmental temperature may differ. Accordingly, the operational temperature of the imager 22 may be used by the blocked imager detection system 10 as this temperature is generally tied to operation of the imager 22. As will be described in further detail herein, when the sensed operational temperature of the imager 22 does not exceed a certain temperature threshold, it may be desirable to deactivate the display module 20 such that a rear view of the vehicle 12 is provided by a mirror portion of the electro-optic element 18 of the rearview assembly 14 rather than displayed on the display module 20. Notably, the temperature threshold is not limited to a specific operational temperature, but may include operational temperatures associated with environmental temperatures that are at or near freezing (0° C.). Further, the operational temperature may be determined in various ways as discussed herein. Notably, any suitable way for measuring the temperature at the imager 22 is contemplated without departing from the teaching as set forth in this disclosure. In addition, it will be understood that the manner in which the operational temperature affects the performance and/or use of the display module 20 may be flexible such that a vehicle manufacturer can utilize the information as desired. Generally, the system as set forth herein allows a vehicle manufacturer flexibility in deciding how and when to activate the display module 20 and deactivate the display module 20 based on detected operational temperature information or blocked imager determinations.

With reference now to FIGS. 2 and 3, the rearview assembly 14 is configured to be coupled to a windshield 23 of the vehicle 12. The rearview assembly 14 may be operably coupled with a forward imaging device 27 via a single ball or double ball mount 28. A shroud 29 is configured to conceal the forward imaging device 27 and possibly other electronics. Power and data wiring 25 may extend through the shroud 29 upward along the windshield 23. The electro-optic element 18 may be positioned proximate a forward opening of a housing 30 of the rearview assembly 14. Although other constructions are contemplated, the electro-optic element 18 of FIGS. 2 and 3 includes a front substrate 31 defining first and second surfaces 32, 33 and a rear substrate 34 defining third and fourth surfaces 35, 36. A reflective coating 37 is disposed on the third surface 35. The reflective coating 37 is at least partially transmissive so that images on the display module 20 can be shown through the reflective coating 37 of the electro-optic element 18 and be visible to the driver when the display module 20 is activated. It will be understood that the on-axis and off-axis positions may vary from the relative positions shown in FIGS. 2 and 3. More specifically, the off-axis position may correspond to a housing position as set forth in FIG. 3 and an on-axis position may correspond to the housing position as set forth in FIG. 2. Regardless, a motor 38 may be operably coupled with the display module 20 either directly, or by way of an intermediary component (for example, the housing 30). Depending on the ability of the imager 22 to capture sufficient rearward images of the vehicle, the motor 38 may move the display module 20 between the on-axis position and the off-axis position. The motor 38 may move the display module 20 directly or adjust the actuator device 16 to change the position of the display module 20.

The blocked imager detection system 10, as set forth herein, is configured to control activation of the display module 20, which displays a rear external view of the controlled vehicle 12. Although a rear external view is contemplated, the display module 20 may be configured to display captured image data from any external portion of the vehicle. The imager 22 is configured to capture image data of a scene external of the controlled vehicle 12 and the display module 20 is configured to generate images corresponding to the captured image data. The controller 26 receives and analyzes the image data and generates a control signal that is used to control the relative position and activation state of the display module 20 in the rearview assembly 14. The control signal is generated in response to analysis of the image data. The controller 26 may be configured to directly connect to the display module 20 and the electro-optic element 18. Alternatively, the controller 26 may be configured to connect to an equipment control or bus, such as a controller area network (CAN) bus of the controlled vehicle 12, which then sends a control signal to the motor 38 to adjust the actuator device 16 resulting in activation or deactivation of the display module 20 and possibly tilting of the electro-optic element 18. The controller 26 is illustrated within the housing 30 of the rearview assembly 14. However, the controller 26 could also be positioned elsewhere within the housing 30. For example, the controller 26 may be disposed adjacent to the imager 22, possibly on an external portion of the vehicle 12. The controller 26 may include functionality to analyze captured images provided by the imager 22 and may also have functionality that controls exterior lighting, such as the headlights or brake lights of the vehicle 12. The imager 22 may be disposed on a roof, trunk lid, etc. of the vehicle 12 and can be disposed below sheet paneling or exterior trim of the vehicle 12.

With reference again to FIG. 1, the blocked imager detection system 10 is configured for use with the display module 20 inside the controlled vehicle 12, but could also be used in other applications. It will be understood that the rearview assembly 14 may also be operably linked with external rearview assemblies 40. In this instance, an imager 41 may be positioned on the vehicle, for example, on the external rearview assembly 40, and aligned to capture image data at a similar viewing angle to a reflected image that would otherwise be provided by an external electro-optic element 42 of the external rearview assembly 40. Like the electro-optic element 18 of the rearview assembly 14, the electro-optic element 42 includes at least one reflective coating that is capable of providing a rearward view of the vehicle 12. The electro-optic elements 18, 42 as set forth herein may be electrochromic assemblies with auto-dimming functionality.

Figure 8:
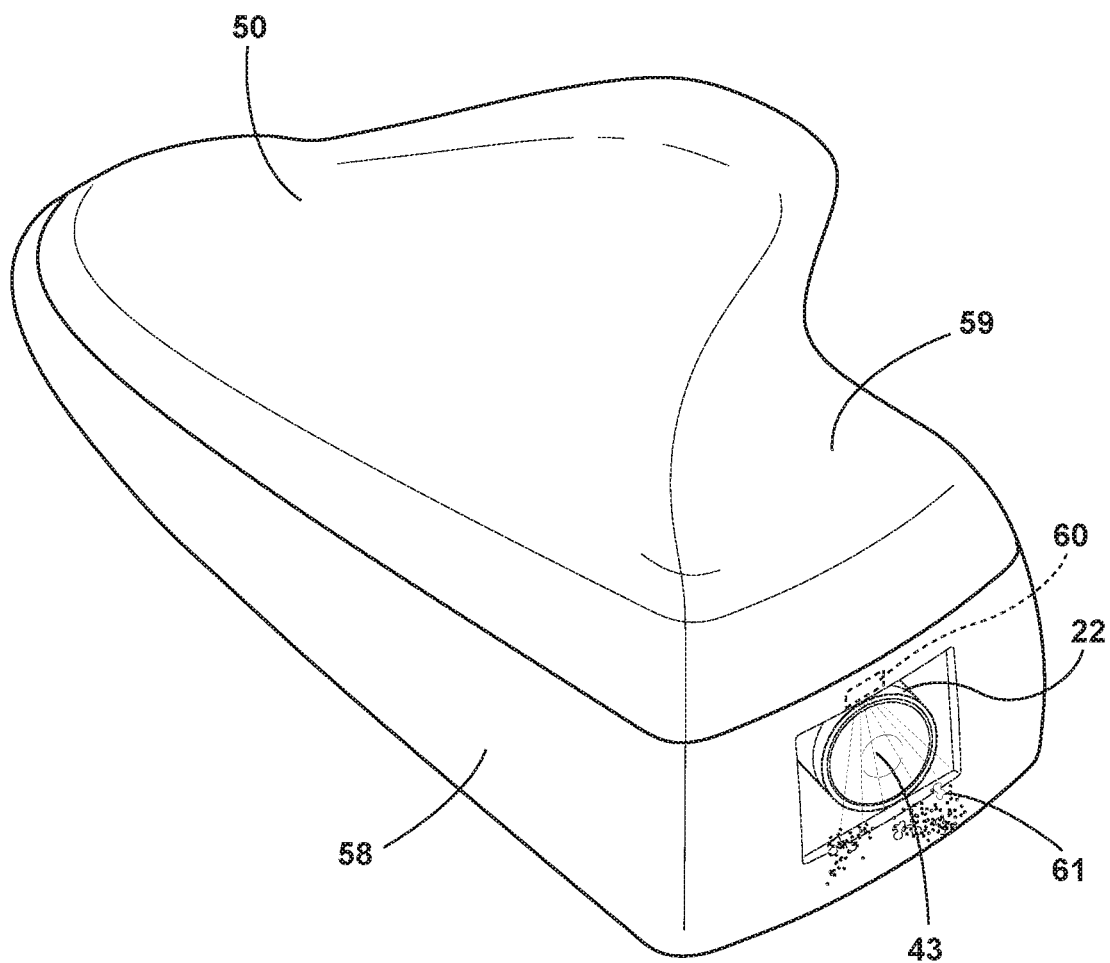
FIG. 8 is a rear top perspective view of a roof mounted antenna and imager module with debris being removed from the lens.
Figure 9:
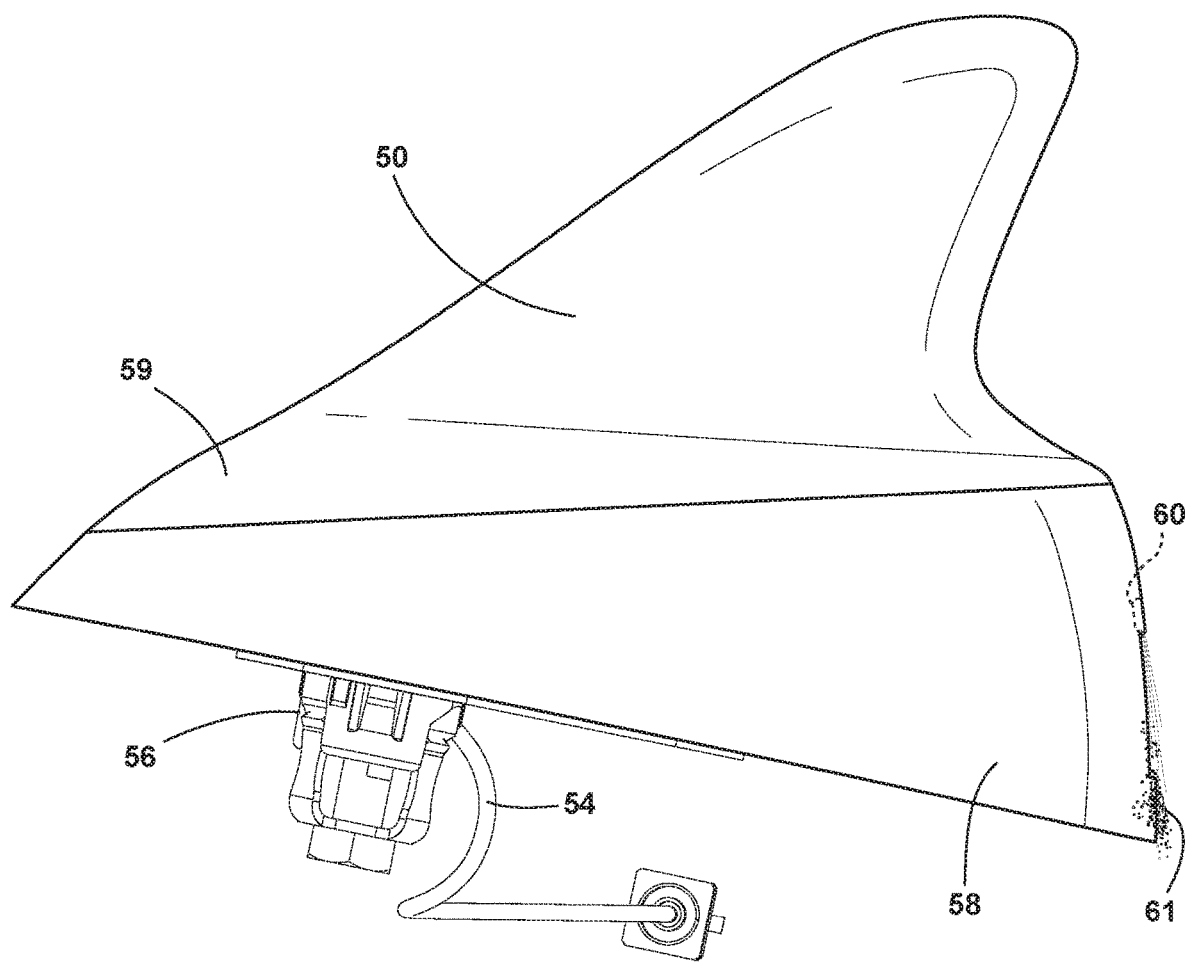
FIG. 9 is a side elevational view of the roof mounted antenna and imager module of FIG. 6 with debris being removed from the lens.

In one example, as shown in FIGS. 1 and 4-9, the imager 22 is located within an antenna housing 50. As set forth in more detail herein, the functionality of the controller 26 may be configured to detect an obstruction 52, such as snow, fog, dirt, condensation, etc., (collectively referred to herein as debris 61) that extends over a portion or all of a lens 43 of the imager 22. The antenna housing 50 includes a wire harness 54 configured to relay image data captured by the imager 22 to the controller 26 for processing. A snap-fit feature 56 operably couples the antenna housing 50 to an exterior panel of the vehicle 12. The antenna housing 50 may also include a lower base 58 with the imager 22 and a top cover 59 that includes an antenna. The antenna housing 50 may also include a lens cleaning apparatus 60 configured to clean or wash the lens 43, as shown in FIGS. 8 and 9. However, in the event the lens cleaning apparatus 60 is unable to clean the lens 43 of debris 61, the controller 26 can deactivate the imager 22, the display module 20, or both. When the lens 43 proximate the imager 22 has been blocked by debris 61 (FIGS. 6 and 7), the controller 26 may be operable to deactivate the display module 20 without moving the electro-optic element 18, or alternatively, to place the electro-optic element 18 in an on-axis position, and simultaneously deactivate the display module 20. The controller 26 may include functionality for detecting a blockage or a failure mode of the imager 22 and activate the lens cleaning apparatus 60 to clear the lens 43. Image data that is received by the controller 26 from the imager 22 is analyzed to determine the quality of the image data captured by the imager 22. The controller 26 may analyze edge detection, gradient, or greyscale matching, pixel data, etc. to determine if an obstruction is present on the lens 43 and if activation of the lens cleaning apparatus 60 has managed to clear the lens 43. Further, as noted above, the controller 26 may deactivate the display module 20 when the imager 22 is not functioning properly. Alternatively, as previously noted, the controller 26 may be operably coupled with the actuator device 16, motor 38, or both and configured to adjust the actuator device 16 to tilt the electro-optic element 18, which simultaneously changes the activation state of the display module 20. More specifically, when the imager 22 is incapable of providing a clear image to the display module 20, the controller 26 may deactivate the display module 20, the imager 22, or both so that a rear view of the vehicle 12 is provided by the rearview assembly 14 via the reflective coating 37 disposed adjacent to or within the electro-optic element 18.

The controller 26 may also be operable to sense the operational temperature of the imager 22 via a temperature sensor such as a thermistor, for example. The operational temperature of the imager 22 will generally tend to increase with an increase in environmental temperature and decrease with a decreasing environmental temperature. However, there will also be instances where the operational temperature of the imager 22 is different from the environmental temperature. For example, the environmental temperature may be very low, such that frost or ice may form on the vehicle 12, and possibly the lens 43 of the imager 22, when parked outside. However, a rear portion of the vehicle may be exposed to sunlight, which may raise the operational temperature of the imager 22, such that ice or frost is melted from the imager 22 or does not form on the imager 22. It will be understood that when the sensed operational temperature does not exceed a certain temperature threshold, the controller 26 may send a signal to the electro-optic element 18 to maintain an on-axis position such that a reflection is provided by the reflective coating 37 of the electro-optic element 18. The display module 20 is not activated and accordingly does not display an unclear image to the driver. Instead, a clear reflected image from the electro-optic element 18 is visible to the driver. As previously noted, in certain operational conditions, the lens 43 may be blocked by debris 61, which is independent of the operational or environmental temperature. Thus, because the controller 26 has the ability to identify a blocked imager condition, and also to sense an operational temperature of the imager 22, the blocked imager detection system 10 can advantageously provide flexibility in how the imager 22 functions, as well as how the rearview assembly 14 of the controlled vehicle 12 functions.

The controller 26 may also provide the blocked imager information to the vehicle bus. The bus may be any suitable communication link such as a CAN bus, LIN bus, vehicle bus, etc. This allows the vehicle manufacturer flexibility in deciding how to respond to a blocked imager detection indication or removal of the indication. For example, if a blocked imager is detected, the manufacturer may desire for a user to manually adjust the rearview assembly 14 via the actuator device 16 (rather than automatically by the motor 38) to move the electro-optic element 18 and the display module 20 to an on-axis position. Alternatively, the manufacturer may choose to allow the controller 26 to control whether the electro-optic element 18 and the display module 20 are in an off-axis position where the display module 20 is activated, or an on-axis position where a rear view of the vehicle is provided via the reflective coating 37 of the electro-optic element 18. Thus, this system allows auto manufacturers to respond to a blocked imager indication in a manner that suits the manufacturer. Further, different features of equipment control within the vehicle may also be enabled or disabled based on the detection of a blocked imager condition.

Figure 10:
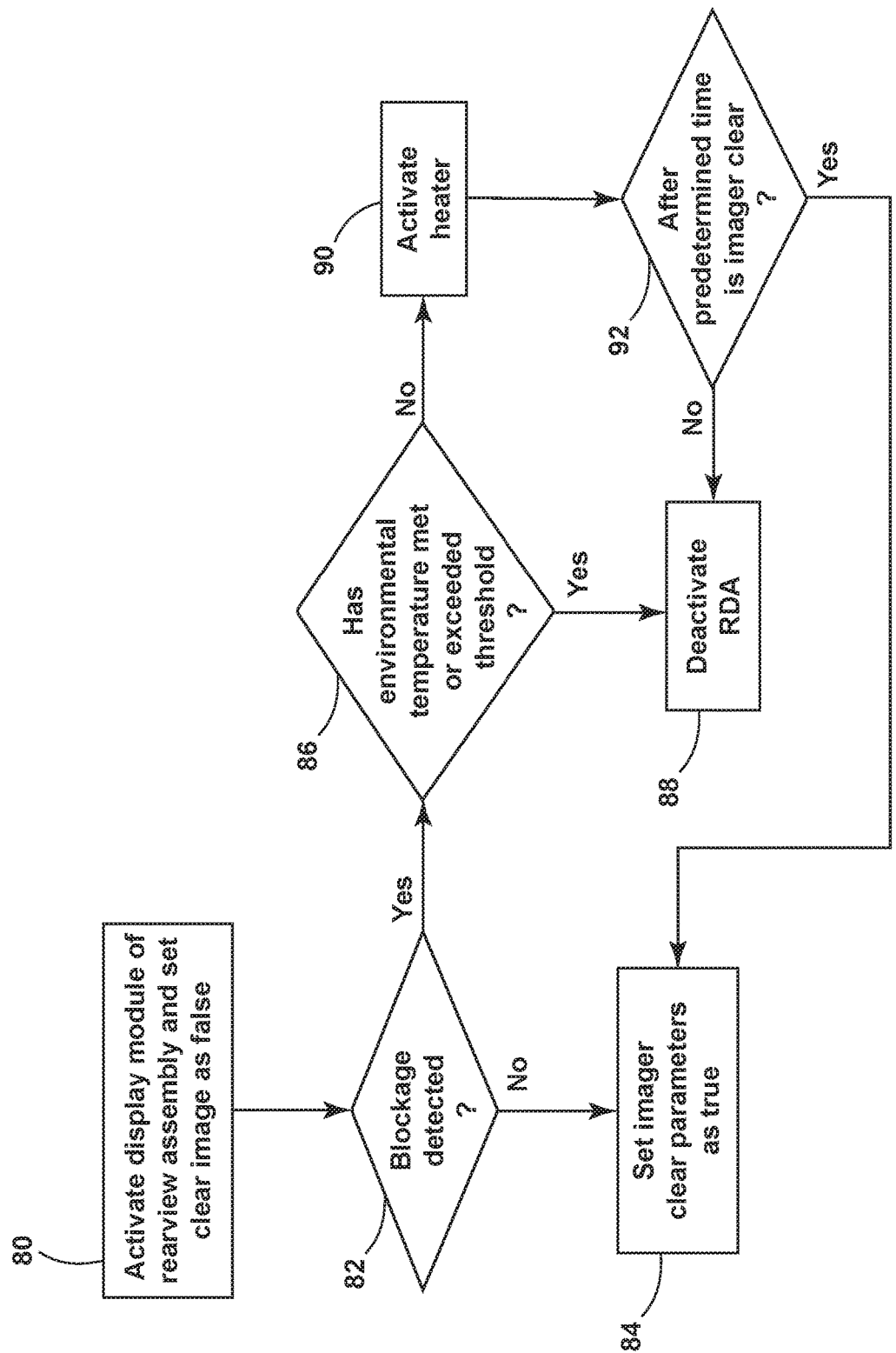
FIG. 10 is a flowchart illustrating an example of blocked imager detection system functionality.

With reference now to FIG. 10, one embodiment of a flowchart illustrating a blocked imager detection system functionality is provided. Initially, the display module 20 of the rearview assembly is activated and a clear image parameter of the controller 26 is set as false in step 80. Upon activation, an algorithm to detect a blockage is activated in step 82. If a blockage is not detected, then an imager clear parameter is set as true in step 84. However, if a blockage is detected, then a second algorithm is run to determine whether an environmental temperature has met or exceeded a threshold requirement in step 86. If the environmental temperature has been met or exceeded, then the rearview assembly is deactivated in step 88, and the driver can then rely on the reflective layer disposed in or adjacent to the electro-optic element. If the environmental temperature has not been met or exceeded, then a heater within the rearview assembly may be activated in step 90 in an effort to melt or vaporize water, frost, snow, etc. that may have collected on the lens 43 of the imager 22. After a predetermined time, blockage detection is then reevaluated to determine if the imager 22 is clear in step 92. If so, then the imager clear parameter is set as true in step 84. If not, then the rearview assembly is deactivated in step 88. It will be understood that variations to this logic may be present. It will also be understood that additional features and functions may also be present within the blocked imager detection system subroutine.

In some instances, the imager 22 may not be blocked, but rather, the imager 22 or the display module 20 may be malfunctioning, or not functioning at all. In this instance, the same general logic can be applied by the controller 26. More specifically, if the controller 26 detects a failure mode of the imager 22 or the display module 20, then the controller 26 may act to deactivate, at least temporarily, the display module 20 and possibly the imager 22. In this instance, a reflected rear view would be provided to an occupant by the electro-optic element 18. If the controller 26 detects that the display module 20 or the imager 22 are both working properly, and are not blocked, then the display module 20 and the imager 22 can be activated.

Figure 11:
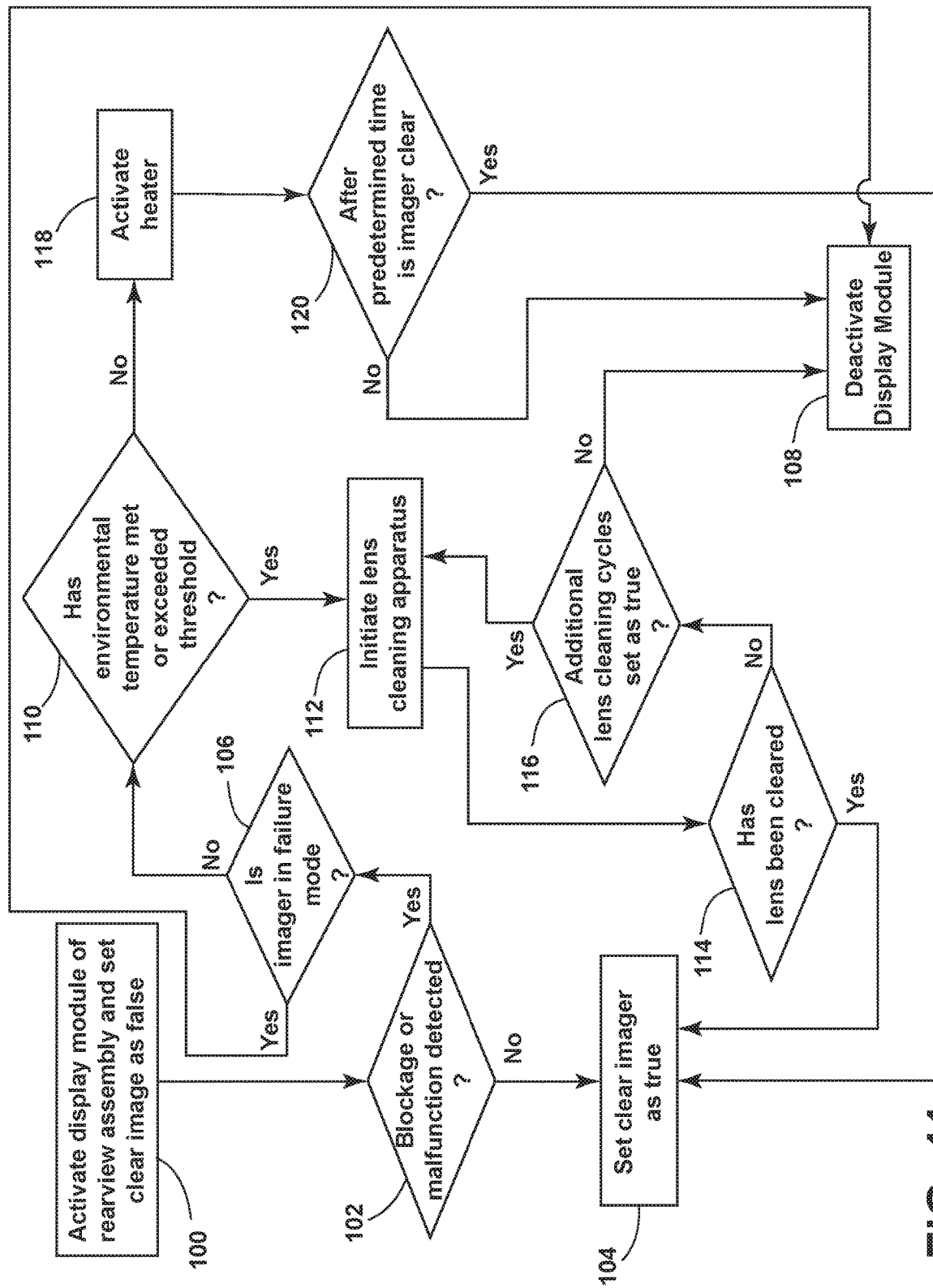
FIG. 11 is another flowchart illustrating an example of blocked imager detection system functionality.

With reference now to FIG. 11, another embodiment of a flowchart illustrating a blocked imager detection system functionality is provided. Initially, the display module 20 of the rearview assembly is activated in step 100. Upon activation, an algorithm to detect a blockage or malfunction is activated in step 102. If a blockage is not detected, then an imager clear parameter is set as true in step 104. If the imager 22 is detected as being in a failure mode (step 106), then the display module 20 is deactivated in step 108. If the imager 22 is not in a failure mode (step 106), then a second algorithm is run to determine whether an environmental temperature has met or exceeded a threshold requirement in step 110. If the environmental temperature has been met or exceeded, then a lens cleaning apparatus 60 may be initiated in step 112 to clear a possible blockage. If the controller determines that the lens 43 has been cleared in step 114 after initiation of the lens cleaning apparatus 60 in step 112, then the imager clear parameter is set as true in step 104. If, after the lens cleaning apparatus 60 has been initiated in step 112, and the controller determines that there is still a blocked imager condition, the controller checks to see if the additional lens cleaning cycles parameter is set as true in step 116, and if so, the lens cleaning apparatus 60 is initiated again in step 112. If the additional lens cleaning cycles parameter is not set as true in step 116, then the display module 20 is deactivated in step 108 and the driver can then rely on the reflective coating 37 disposed in or adjacent to the electro-optic element 18. If the environmental temperature has not been met or exceeded (step 110), then a heater within the rearview assembly may be activated in step 118 in an effort to melt or vaporize water, frost, snow, etc. that may have collected on the lens 43 of the imager 22. After a predetermined time, blockage detection is then reevaluated to determine if the imager 22 is clear in step 120. If the imager 22 is clear, then the imager clear parameter is set as true in step 104 and the display module 20 is activated for viewing by the driver. If not, then the rearview assembly 14 is deactivated in step 108 and the driver may rely on the reflective coating 37 of the electro-optic element 18 to view behind the vehicle. It will be understood that variations to this logic may be present. It will also be understood that additional features and functions may also be present within the blocked imager detection system subroutine.

It is also contemplated that, during a failure mode or blockage of the imager 22, information relating to the blocked or malfunctioning imager 22 may be displayed on the display module 20. The display module 20 can provide messaging that conveys why the display module 20 is not available and that a reflected image will be provided instead. Alternatively, the information may relate to suggestions for activating the deactivated display module 20.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A blocked imager detection system for use in a controlled vehicle, comprising:
   a rearview assembly including an actuator device operably coupled with an electro-optic element, wherein the actuator device is adjustable to tilt the electro-optic element in one direction, thereby moving the electro-optic element to an off-axis position which approximately simultaneously changes an activation state of a display module to an activated state, and wherein the actuator device is also adjustable to tilt the electro-optic element in another direction, thereby moving the electro-optic element to an on-axis position which approximately simultaneously changes the activation state of the display module to a deactivated state;
   an imager configured to capture images of a scene external to the controlled vehicle and to generate image data for display on the display module; and
   a controller configured to receive blocked imager information relating to an image capturing capability of the imager, wherein the controller is configured to detect when the operational capability of the imager to capture image data is at least partially diminished, and can generate a control signal indicating that imager performance has been compromised and adjust the electro-optic element to an on-axis position and simultaneously deactivate the display module.

2. The blocked imager detection system for use in a controlled vehicle of claim 1, further comprising:
   a temperature sensor operably coupled with the controller.

3. The blocked imager detection system for use in a controlled vehicle of claim 1, further comprising:
   a lens cleaning apparatus configured to at least partially clear a lens through which the imager captures image data.

4. The blocked imager detection system for use in a controlled vehicle of claim 3, further comprising:
   a heating element operable to perform at least one of a defogging and defrosting function when diminished performance or an obstruction of the lens of the imager has been detected.

5. The blocked imager detection system for use in a controlled vehicle of claim 1, wherein the imager includes an imager sensor that captures pixel data that is evaluated by the controller to determine if imager performance has been compromised.

6. The blocked imager detection system for use in a controlled vehicle of claim 1, wherein the controller is configured to detect a failure mode of the imager and deactivate the display module.

7. A blocked imager detection system for use in a controlled vehicle, comprising:
   a display module;
   an electro-optic element disposed adjacent to the display module;
   a rearview assembly including an actuator device operably coupled with the electro-optic element, wherein the actuator device is adjustable to tilt the electro-optic element between an off-axis position which approximately simultaneously changes the display module to one of an activated state and a deactivated state, and an on-axis position which approximately simultaneously changes the display module to the other of the activated state and the deactivated state; and
   a controller configured to receive image data from an imager, wherein when the controller determines that the operational capability of the imager to capture images is at least partially diminished, the controller can generate a control signal indicating that imager performance has been compromised and prohibit activation of the display module such that a rearward view is provided by the electro-optic element rather than by the display module.

8. The blocked imager detection system for use in a controlled vehicle of claim 7, wherein the display module is configured to relay information to a user that the imager is blocked.

9. The blocked imager detection system for use in a controlled vehicle of claim 7, further comprising:
   a temperature sensor operably coupled with the controller.

10. The blocked imager detection system for use in a controlled vehicle of claim 7, further comprising:
    a lens cleaning apparatus configured to at least partially clear a lens of the imager.

11. The blocked imager detection system for use in a controlled vehicle of claim 10, further comprising:
    a heating element operable to perform at least one of a defogging and defrosting function when diminished performance or an obstruction of the lens of the imager has been detected.

12. The blocked imager detection system for use in a controlled vehicle of claim 7, wherein the imager includes an imager sensor that captures pixel data that is evaluated by the controller to determine if imager performance has been compromised.

13. The blocked imager detection system for use in a controlled vehicle of claim 7, wherein the controller is configured to detect a failure mode of the imager.

14. A rearview assembly for a vehicle, comprising:
    a housing;
    an electro-optic element disposed in an opening of the housing;
    a display module disposed between the electro-optic element and the housing, wherein the display module provides an image of a scene exterior to said vehicle;
    a rearview assembly including an actuator device operably coupled with the electro-optic element, wherein the actuator device is adjustable to tilt the electro-optic element between first and second positions; and
    a controller configured to receive image data from an imager, wherein when the controller determines that the operational capability of the imager to capture images is at least partially diminished, the controller can generate a control signal indicating that imager performance has been compromised and deactivate the display module, wherein the controller is configured to detect a failure mode of the imager and prohibit activation of the display module such that a rearward view is provided by the electro-optic element rather than by the display module.

15. The rearview assembly of claim 14, further comprising:
a temperature sensor operably coupled with the controller.

16. The rearview assembly of claim 14, wherein the temperature sensor includes a thermistor.

17. The rearview assembly of claim 14, wherein the display module is configured to relay information to a user that the imager is blocked.

18. The rearview assembly of claim 14, further comprising:
a lens cleaning apparatus configured to at least partially clear a lens of the imager.

19. The rearview assembly of claim 18, further comprising:
a heating element operably coupled with the imager and operable to perform at least one of a defogging and defrosting function when diminished performance or an obstruction of the lens of the imager has been detected.

* * * * *